US010141801B2

(12) United States Patent
Cao et al.

(10) Patent No.: US 10,141,801 B2
(45) Date of Patent: Nov. 27, 2018

(54) ELECTRIC MACHINES, STATORS AND COMPRESSORS AND METHODS OF MANUFACTURING SAME

(71) Applicant: Emerson Electric Co., St. Louis, MO (US)

(72) Inventors: Pingshan Cao, Suzhou (CN); Xin Li, Suzhou (CN); Xin Li, Suzhou (CN); Yan Zhuang, Suzhou (CN)

(73) Assignee: Emerson Electric Co., St. Louis, MO (US)

( * ) Notice: Subject to any disclaimer, the term of this patent is extended or adjusted under 35 U.S.C. 154(b) by 237 days.

(21) Appl. No.: 14/443,839

(22) PCT Filed: Nov. 22, 2012

(86) PCT No.: PCT/CN2012/085044
§ 371 (c)(1),
(2) Date: May 19, 2015

(87) PCT Pub. No.: WO2014/079015
PCT Pub. Date: May 30, 2014

(65) Prior Publication Data
US 2015/0318742 A1    Nov. 5, 2015

(51) Int. Cl.
*H02K 1/27* (2006.01)
*H02K 1/16* (2006.01)
(Continued)

(52) U.S. Cl.
CPC .............. *H02K 1/276* (2013.01); *H02K 1/04* (2013.01); *H02K 1/16* (2013.01); *H02K 15/02* (2013.01);
(Continued)

(58) Field of Classification Search
CPC ..................................... H02K 1/276
See application file for complete search history.

(56) References Cited

U.S. PATENT DOCUMENTS 2,085,092 A * 6/1937 Furth .................. H01F 41/0233
29/598
3,202,851 A * 8/1965 Dehlendorf .............. H02K 1/16
29/521
(Continued)

FOREIGN PATENT DOCUMENTS

CN    2715415       8/2005
CN    101026318 A   8/2007
(Continued)

OTHER PUBLICATIONS

Aldo Boglietti, et al., Experimental Comparison of Induction and Synchronous Reluctance Motors Performance, 2005, 6 pages.
(Continued)

*Primary Examiner* — Robert W Horn
(74) *Attorney, Agent, or Firm* — Harness, Dickey & Pierce, P.L.C.

(57) ABSTRACT

A method of manufacturing dynamoelectric machines includes producing a first plurality and a second plurality of stator and rotor laminations using a die press, forming a first rotor from the first plurality of rotor laminations, and forming a second rotor from the second plurality of rotor laminations. The first plurality and the second plurality of stator laminations have the same inner and outer diameters. The first plurality and the second plurality of rotor laminations have the same inner and outer diameters. The first plurality of rotor laminations have a first magnet slot configuration and the second plurality of rotor laminations have a second magnet slot configuration different than the first magnet slot configuration. The first rotor and the second rotor may have the same or different stack heights. Preferably, a ratio of each stator lamination's inner diameter to outer diameter is at least 60%.

9 Claims, 5 Drawing Sheets

(51) Int. Cl.
*H02K 1/04* (2006.01)
*H02K 15/02* (2006.01)
*H02K 15/03* (2006.01)

(52) U.S. Cl.
CPC ........... *H02K 15/024* (2013.01); *H02K 15/03* (2013.01); *H02K 2213/09* (2013.01); *H02K 2213/12* (2013.01); *Y10T 29/49014* (2015.01)

(56) References Cited

U.S. PATENT DOCUMENTS

| | | | | |
|---|---|---|---|---|
| 3,203,077 | A * | 8/1965 | Zimmerle | H02K 15/024 29/429 |
| 3,834,013 | A * | 9/1974 | Gerstle | B23P 9/02 148/120 |
| 4,320,645 | A * | 3/1982 | Stanley | B21D 28/22 174/DIG. 20 |
| 4,469,970 | A * | 9/1984 | Neumann | H02K 1/2773 310/156.78 |
| 4,568,846 | A * | 2/1986 | Kapadia | H02K 21/46 310/156.83 |
| 4,801,832 | A | 1/1989 | Neumann | |
| 4,947,720 | A * | 8/1990 | Howe | B21D 28/145 83/146 |
| 4,998,430 | A * | 3/1991 | Howe | B21D 28/22 72/329 |
| 5,204,572 | A * | 4/1993 | Ferreira | H02K 49/106 310/156.19 |
| 5,265,320 | A * | 11/1993 | Greenway | B21D 28/22 29/596 |
| 5,333,525 | A * | 8/1994 | Schlegel | H02K 15/024 29/596 |
| 5,349,741 | A * | 9/1994 | Neuenschwander | B21D 28/22 29/596 |
| 5,604,971 | A * | 2/1997 | Steiner | H01F 41/0233 29/596 |
| 5,636,432 | A * | 6/1997 | Usher | H02K 1/165 29/596 |
| 5,767,607 | A * | 6/1998 | Kieffer | H02K 1/20 310/193 |
| 5,786,650 | A * | 7/1998 | Uchida | H02K 1/2773 310/156.55 |
| 5,829,120 | A * | 11/1998 | Uchida | H02K 1/2773 29/598 |
| 6,703,741 | B1 * | 3/2004 | Ifrim | H02K 1/2773 310/156.19 |
| 6,792,673 | B2 * | 9/2004 | Barrera | H02K 15/02 29/598 |
| 6,969,937 | B1 * | 11/2005 | Schuering | H02K 1/2766 310/156.01 |
| 7,120,985 | B2 * | 10/2006 | Nouzumi | H02K 1/148 29/596 |
| 7,603,760 | B1 * | 10/2009 | Lebbin, Jr. | H02K 15/026 29/596 |
| 7,939,982 | B2 * | 5/2011 | Horst | H02K 1/276 310/156.45 |
| 8,286,331 | B2 * | 10/2012 | Hashimoto | H02K 1/146 29/564.1 |
| 8,519,588 | B2 * | 8/2013 | Amrhein | H02K 1/276 310/156.56 |
| 8,704,422 | B2 * | 4/2014 | Jurkowski | H02K 1/146 29/596 |
| 8,786,158 | B2 * | 7/2014 | Neuenschwander | H02K 1/148 310/216.043 |
| 8,922,083 | B2 * | 12/2014 | Asahi | H02K 1/2706 310/156.08 |
| 9,099,905 | B2 * | 8/2015 | Manz | H02K 1/2773 |
| 2013/0106228 | A1 * | 5/2013 | Aoyama | H02K 21/14 310/156.53 |
| 2013/0249332 | A1 * | 9/2013 | Yoshida | H02K 37/14 310/49.37 |
| 2013/0270949 | A1 * | 10/2013 | Gracia | H02K 1/02 310/152 |
| 2014/0091663 | A1 * | 4/2014 | Hazeyama | H02K 1/276 310/156.11 |
| 2014/0203674 | A1 * | 7/2014 | Cao | H02K 1/32 310/54 |
| 2015/0318742 | A1 * | 11/2015 | Cao | H02K 15/03 310/156.53 |

FOREIGN PATENT DOCUMENTS

| | | |
|---|---|---|
| CN | 101192766 | 6/2008 |
| CN | 101622390 A | 1/2010 |
| CN | 202424345 | 9/2012 |
| WO | 2008/106262 | 9/2008 |

OTHER PUBLICATIONS

Lusu Guo, et al., Effects of Magnet Shape on Torque Characteristics of Interior Permanent Magnet Machines, 2009, 5 pages.
A.M. Osheiba, et al., Performance of Hysteresis Permanent Magnet Motors, Electric Machines & Power Systems, Apr. 2007, vol. 16, Issue 4, 1 page.
Richard Owen, et al., Review of Variable-flux Permanent Magnet Machines, 2011, 6 pages.
Leila Parsa, et al., Reducing Torque Pulsation of Multi-Phase Interior Permanent Magnet Machines, 6 pages, 2006.
Wen L. Soong, et al., Field-Weakening Performance of Interior Permanent-Magnet Motors, IEEE Transactions on Industry Applications, Sep./Oct. 2002, 8 pages, vol. 38, No. 5.
Robert Vartanian, et al., Design and Fabrication of a Permanent Magnet Assisted Synchronous Reluctance Machine (PMa-SynRM) Using a NEMA Frame Induction Machine Stator, Jan. 27, 2012, 1 page.
Steve Williamson, et al., The Effect of Interbar Currents in a Permanent Split Capacitor Motor, IEEE Transactions on Industry Applications, Mar./Apr. 2006, 6 pages, vol. 42, No. 2.

* cited by examiner

Stator Inner Diameter
Stator Outer Diameter

ELECTRIC MACHINES, STATORS AND COMPRESSORS AND METHODS OF MANUFACTURING SAME

FIELD

The present disclosure relates to electric machines, stators and compressors and methods of manufacturing same.

BACKGROUND

This section provides background information related to the present disclosure which is not necessarily prior art.

An electric machine commonly includes a stationary component called a stator, and a rotating component called the rotor. The stators and rotors are usually formed by stacking multiple layers of electrical-grade steel, called laminations. These laminations may be produced using a die press of various kinds. For example, a progressive die can be configured to produce stator and rotor laminations for a particular electric machine design. Subsequently, the dies in some or all stages of the progressive die can be changed to configure the progressive die to produce stator and rotor laminations for another electric machine design.

For various reasons, a ratio of the inner diameter to the outer diameter of known stators for brushless permanent magnet (BPM) motors having interior permanent magnets for hermetic applications is typically about 55% or less, and no greater than %.

SUMMARY

This section provides a general summary of the disclosure, and is not a comprehensive disclosure of its full scope or all of its features.

According to one aspect of the present disclosure, a method of manufacturing electric machines is provided. The method includes producing a first plurality of stator and rotor laminations using a die press, producing a second plurality of stator and rotor laminations using the die press, using the first plurality of rotor laminations to form a first rotor, and using the second plurality of rotor laminations to form a second rotor. The first plurality of stator laminations and the second plurality of stator laminations have the same inner diameter and the same outer diameter. The first plurality of rotor laminations and the second plurality of rotor laminations have the same inner diameter and the same outer diameter. The first plurality of rotor laminations have a first magnet slot configuration and the second plurality of rotor laminations have a second magnet slot configuration that is different than the first magnet slot configuration.

According to another aspect of the present disclosure, a stator for an electric machine includes a stator core having an inner bore defining an inner diameter of the stator core and an outer periphery defining an outer diameter of the stator core. A ratio of the inner diameter of the stator core to the outer diameter of the stator core is greater than or equal to about sixty percent (60%).

According to yet another aspect of the present disclosure, a stator for an electric machine includes a stator core having an inner bore defining an inner diameter of the stator core and an outer periphery defining an outer diameter of the stator core. A ratio of the inner diameter of the stator core to the outer diameter of the stator core permits the stator to be used with a rotor having a permanent magnet comprising a first magnet material to achieve a first rated full-load efficiency greater than or equal to about 92.5%, and with a rotor having a permanent magnet comprising a second magnet material that is different than the first magnet material to achieve a second rated full-load efficiency greater than or equal to about 92.5%.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1A:
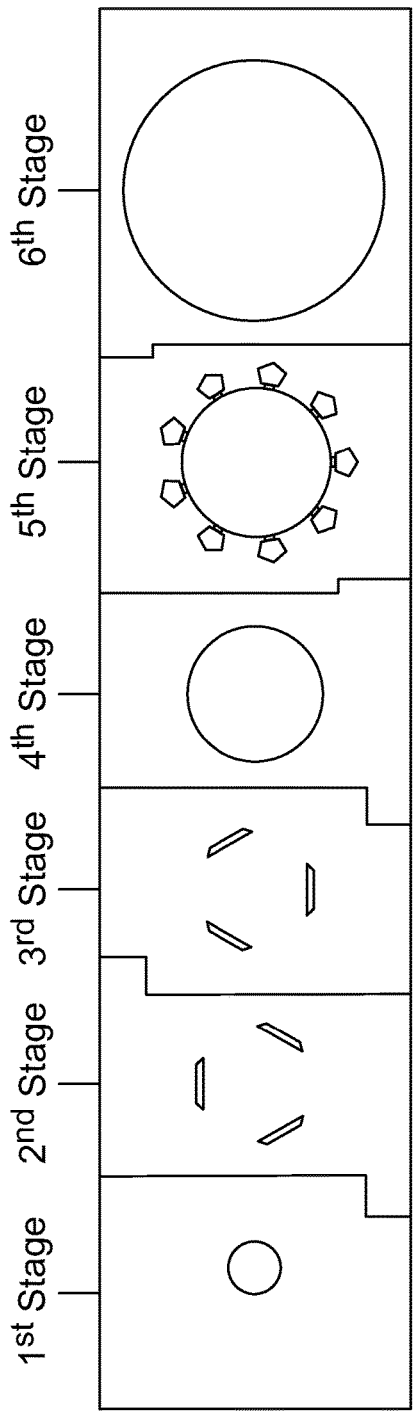
FIG. 1A is a top view of a progressive die illustrating cutting operations in each stage of the die.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A method of manufacturing dynamoelectric machines (including electric motors and generators) according to one example embodiment of the present disclosure will now be described with reference to FIGS. 1-6. In this particular example, stator and rotor laminations for electric machines are produced by feeding a sheet of electrical-grade steel (or another suitable material) through a progressive die having multiple cutting stages. This is illustrated generally in FIGS. 1A and 1B for a particular electric machine design. FIG. 1A illustrates the cutting operations in each stage of the progressive die, and FIG. 1B illustrates how the stator and rotor laminations are progressively formed.

As shown in FIG. 1A, the inner bore of each rotor lamination is stamped in the first stage of the progressive die (on the left side of FIG. 1A). In the second stage, three magnet slots are stamped around the inner bore that was formed in the first stage. In the third stage of the progressive die, three additional magnet slots are formed. In the fourth stage, an additional cut is made to define the outer perimeter of the rotor lamination. At this point in the process, formation of the rotor lamination is complete, as shown in FIG. 1B, and the rotor lamination is separated from the steel sheet. In the fifth stage, additional material is removed from the steel sheet to define the inner bore, slots and teeth of a stator lamination. In the sixth stage, an additional cut is made to define the outer perimeter of the stator lamination. At this point in the process, formation of the stator lamination is complete, as shown in FIG. 1B, and the stator lamination is separated from the steel sheet.

Figure 1B:
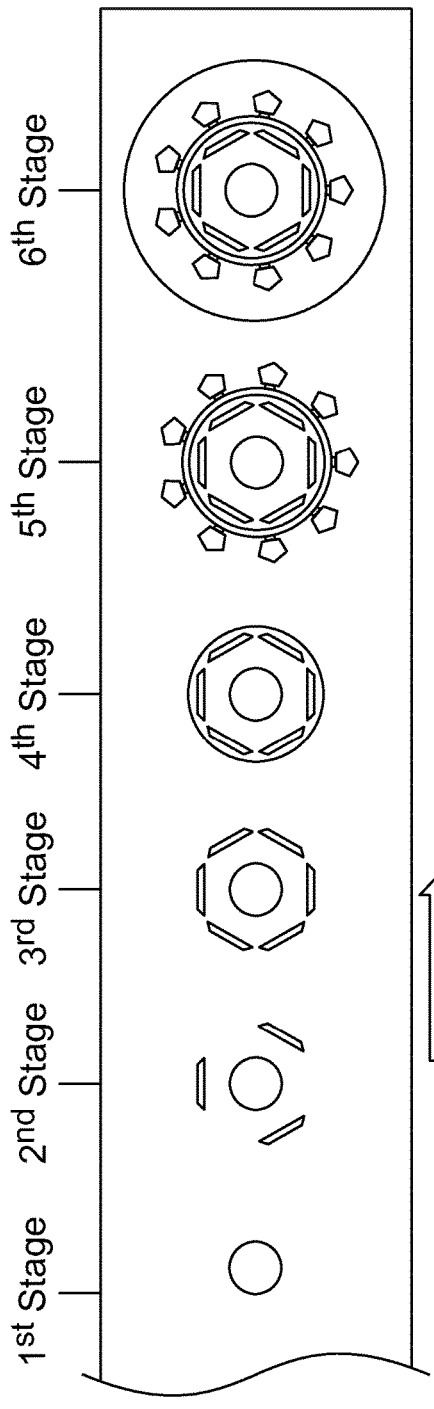
FIG. 1B is a top view of a steel sheet as it progresses through the progressive die of FIG. 1A, illustrating how stator and rotor laminations are progressively formed.

For illustrative purposes, the complete rotor lamination is also shown in the fifth and sixth stages in FIG. 1B. Additionally, the direction of the workpiece (e.g., the steel sheet) is indicated by the arrow (i.e., left to right) in FIG. 1B.

Figure 2:
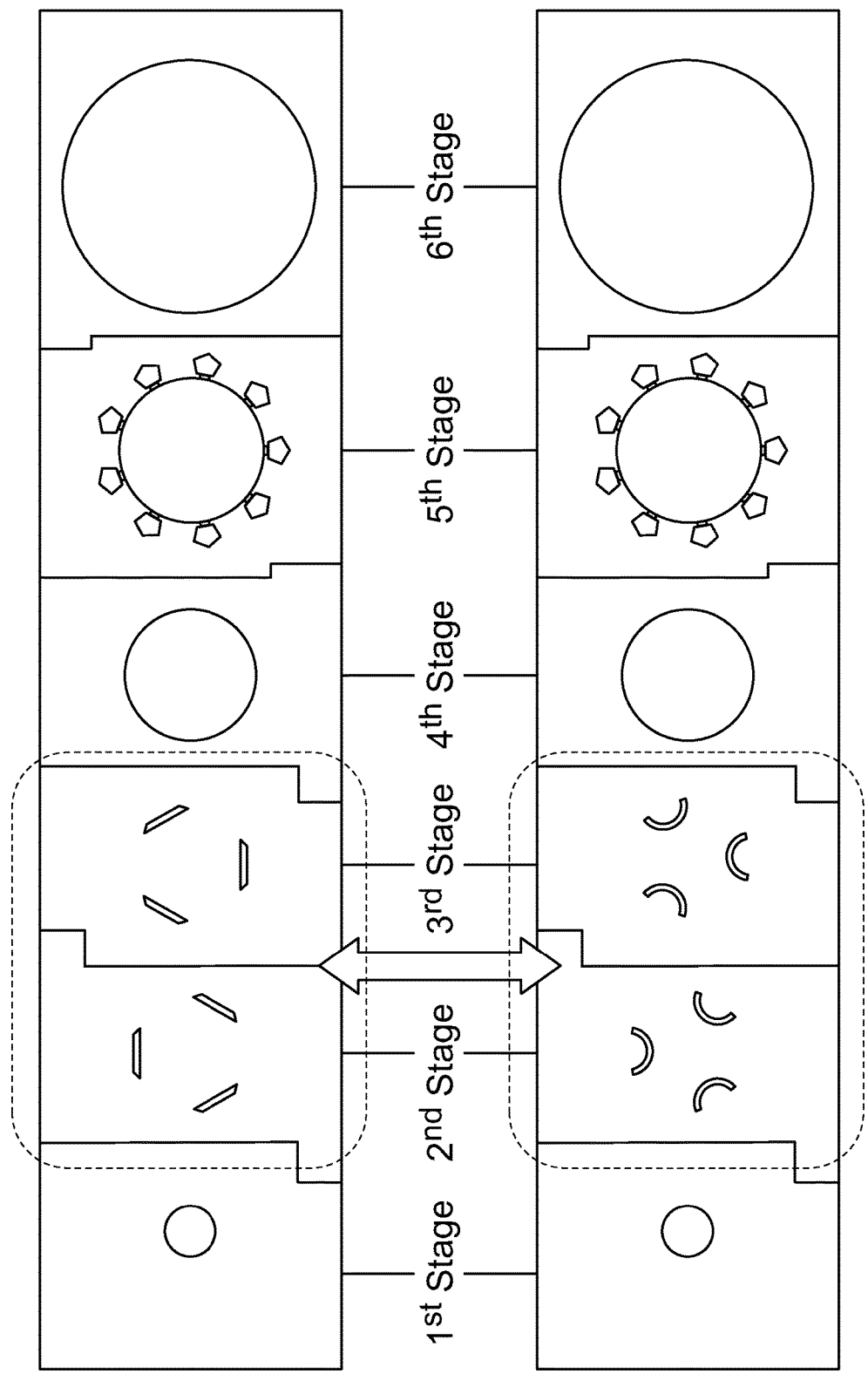
FIG. 2 is a top view similar to FIG. 1A, illustrating changes in the second and third stages of the progressive die to change magnet slot configurations in the rotor laminations.

By changing the dies in the second and third stages of the progressive die (i.e., the magnet slot forming dies), the magnet slot configuration of the rotor laminations can be changed. This is shown generally in FIG. 2. The top portion of FIG. 2 is the same as FIG. 1A, and illustrates the cutting operations in each stage of the progressive die for a particular electric machine design. The bottom portion of FIG. 2 illustrates the cutting operations in each stage of the progressive die—after the dies in the second and third stages are changed—for another electric machine design.

Figure 3:
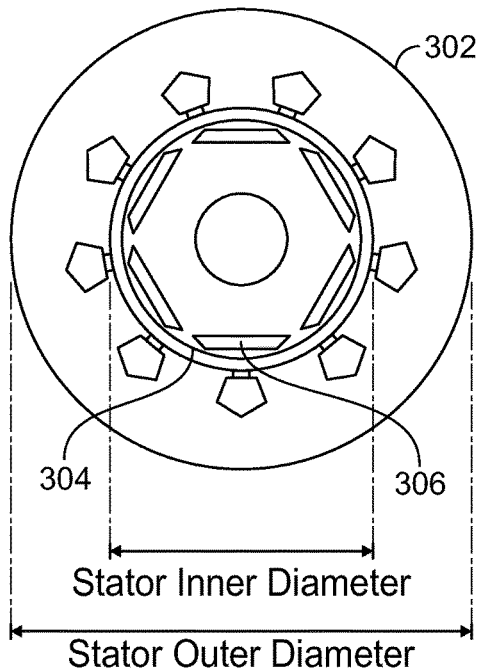
FIG. 3 is a top view of stator and rotor laminations according to one example embodiment of the present disclosure.
Figure 4:
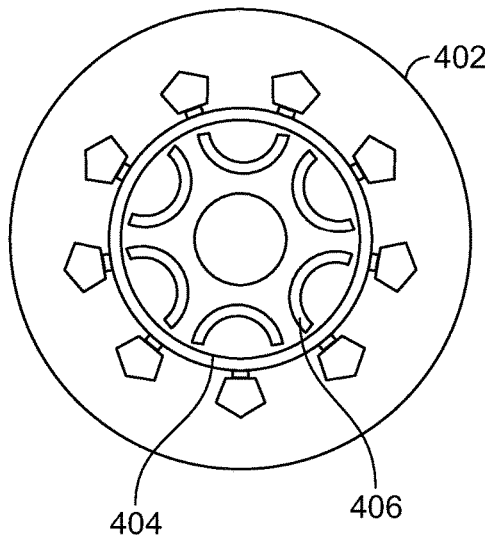
FIG. 4 is a top view of stator and rotor laminations according to another example embodiment of the present disclosure.

FIG. 3 illustrates an example stator lamination 302 and an example rotor lamination 304 produced by the progressive die configuration shown in the top portion of FIG. 2 (and FIG. 1A). Similarly, FIG. 4 illustrates an example stator lamination 402 and an example rotor lamination 404 produced by the progressive die configuration shown in the bottom portion of FIG. 2. The stator laminations 302, 402 shown in FIGS. 3 and 4 have the same inner diameter, the same outer diameter, and the same overall configuration. The rotor laminations 304, 404 also have the same inner diameter and the same outer diameter as one another.

Figure 5:
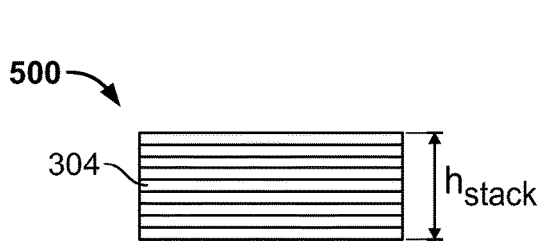
FIG. 5 is a side view of a rotor formed from multiple rotor laminations having the configuration shown in FIG. 3.
Figure 6:
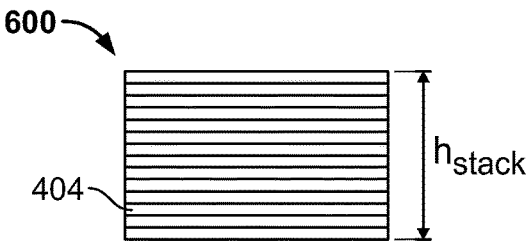
FIG. 6 is a side view of a rotor formed from multiple rotor laminations having the configuration shown in FIG. 4.

FIG. 5 illustrates a rotor 500 formed by stacking multiple rotor laminations 304 of FIG. 3. Similarly, FIG. 6 illustrates a rotor 600 formed by stacking multiple rotor laminations 404 of FIG. 4.

Referring again to FIGS. 3 and 4, the only differences in this example between the rotor lamination 304 of FIG. 3 and the rotor lamination 404 of FIG. 4 are the magnet slot configurations. Because the rotor laminations 304, 404 define—via the magnet slots—the same number of poles and the same pole spacing (i.e., a total of six poles spaced sixty degrees apart from one another), they can be used with identical stator laminations (i.e., stator lamination 302 and stator lamination 402). Alternatively, if the rotor laminations 304, 404 have different numbers of poles or different pole spacings, it may be necessary or desirable to change the die in the fifth stage of the exemplary progressive die, so the stator laminations 302, 402 have tooth and slot configurations that are compatible with the poles and pole spacings defined by their associated rotor laminations. In that event, the tooth and slot configuration of stator lamination 302 will be different than the tooth and slot configuration of stator lamination 402.

The rotor lamination 304 of FIG. 3 has six trapezoidal magnet slots 306. In contrast, the rotor lamination 404 of FIG. 4 has six arc-shaped magnet slots 406. The area of the arc-shaped magnet slots 406 in FIG. 4 is greater than the area of the trapezoidal magnet slots 306 in FIG. 3. Therefore, the arc-shaped magnet slots 406 can hold more magnet material than the trapezoidal magnet slots 306. Consequently, the rotor lamination 404 (and rotor 600) may be used with weaker magnets (e.g., ferrite magnets) than the rotor lamination 304 (and rotor 500), which may be used with stronger magnets, e.g., neodymium magnets.

The additional magnet material accommodated by the magnet slot configuration of rotor lamination 404 (as compared to rotor lamination 304) may completely offset the effect of using weaker magnets. In that event, the stack heights of the rotors 500, 600 may be the same, with the rotors 500, 600 producing the same level of magnetic flux. Alternatively, if the additional magnet material accommodated by the rotor lamination 404 does not completely offset the effect of using weaker magnets, the stack height of rotor 600 may be greater than the stack height of rotor 500, as shown in FIGS. 5 and 6, so the rotors 500, 600 produce the same level of magnetic flux, and can be used in motors having the same or equivalent rated horsepower, despite using different magnet materials.

Alternatively, if the stack heights and magnetic flux of the rotors 500, 600 are the same, the rotors 500, 600 may be interchangeable with one another, and may be compatible with the same stators (i.e., formed from the stator laminations 302 and/or 402 shown in FIGS. 3 and 4) for use in motors having the same or equivalent rated horsepower. In that event, the choice between rotor 500 and rotor 600 for a given application may depend on the current price and/or availability of the magnet material(s) employed in rotor 500 and the magnet material(s) employed in rotor 600.

As apparent to those skilled in the art, the teachings of this disclosure are not limited to a particular number, spacing or orientation of rotor poles, stator slots or stator teeth, and may be applied to, for example, rotors having any even number of poles including four poles, six poles, twelve poles, etc. Similarly, the present teachings are not limited to any particular lamination configurations, pole/slot configurations, magnet slot configurations or magnet materials, and can be implemented using a wide variety of magnet shapes and materials, and combinations thereof (i.e., rotors employing multiple magnet slot shapes and/or multiple magnet materials).

Because the inner diameter and outer diameter of the stator laminations 302, 304 are the same, and the inner diameter and the outer diameter of the rotor laminations 304, 404 are the same, a variety of electric machine designs can be produced without changing all dies in the press. In the example shown in FIG. 2, the dies in only two stages of the progressive die (i.e., the second and third stages) may be changed to convert the press from producing rotor lamination 304 to rotor lamination 404, or vice versa. Further, if the rotor laminations 304, 404 have a different number of poles or pole spacings, only one additional die (i.e., in the fifth stage) may be changed so the stator laminations 302, 402 are compatible with the rotor laminations 304, 404, respectively. In other embodiments, only one die may need to be changed (i.e., in only one stage of a progressive die, or in the only stage of a "single-out" die press) to convert the die press from one machine design to another.

Figure 7:
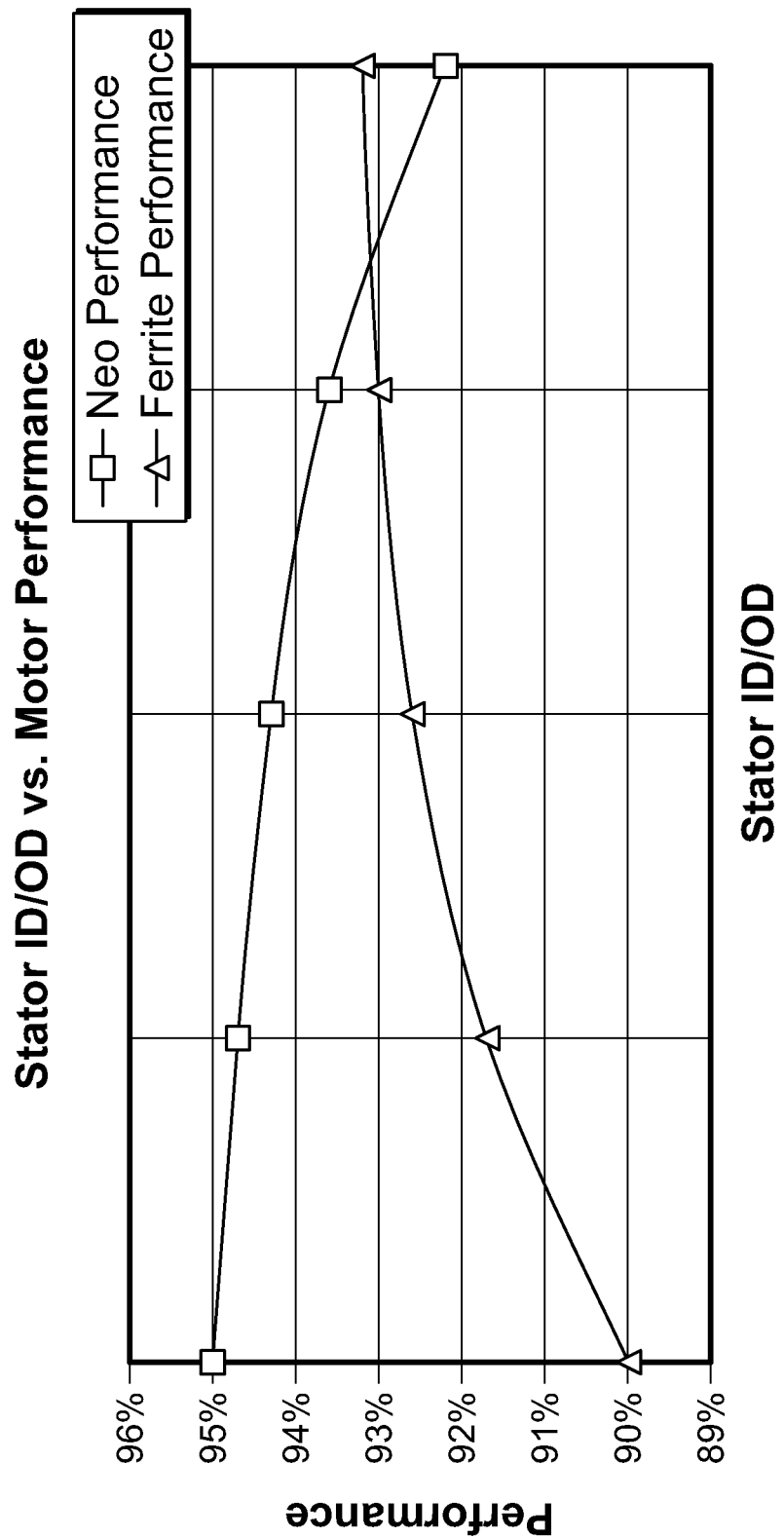
FIG. 7 is a graph illustrating efficiency as a function of stator ID/OD ratio for electric motors employing neodymium and ferrite magnets.

FIG. 7 illustrates the performance (i.e., efficiency) of two electric motor designs relative to their stator's inner diameter to outer diameter ratios. One of the motor designs uses the stator and rotor configurations shown in FIG. 3 with neodymium magnets, and the other motor design uses the stator and rotor configurations shown in FIG. 4 with ferrite magnets. As shown in FIG. 7, the efficiency of the neodymium motor decreases as its stator ID/OD ratio increases. Conversely, the efficiency of the ferrite motor increases as its stator ID/OD ratio increases.

Many machine applications demand efficiencies of ninety percent (90%) or greater. Accordingly, the ID/OD ratio of the various stators described herein is preferably at least sixty percent (60%) so a given stator can be used with, e.g., a rotor employing neodymium magnets or a rotor employing ferrite magnets and, in both cases, achieve a rated full-load efficiency of at least 92.5%. More preferably, the stator ID/OD is greater than or equal to about 62% and, most preferably, is greater than or equal to about 65%.

Figure 8:
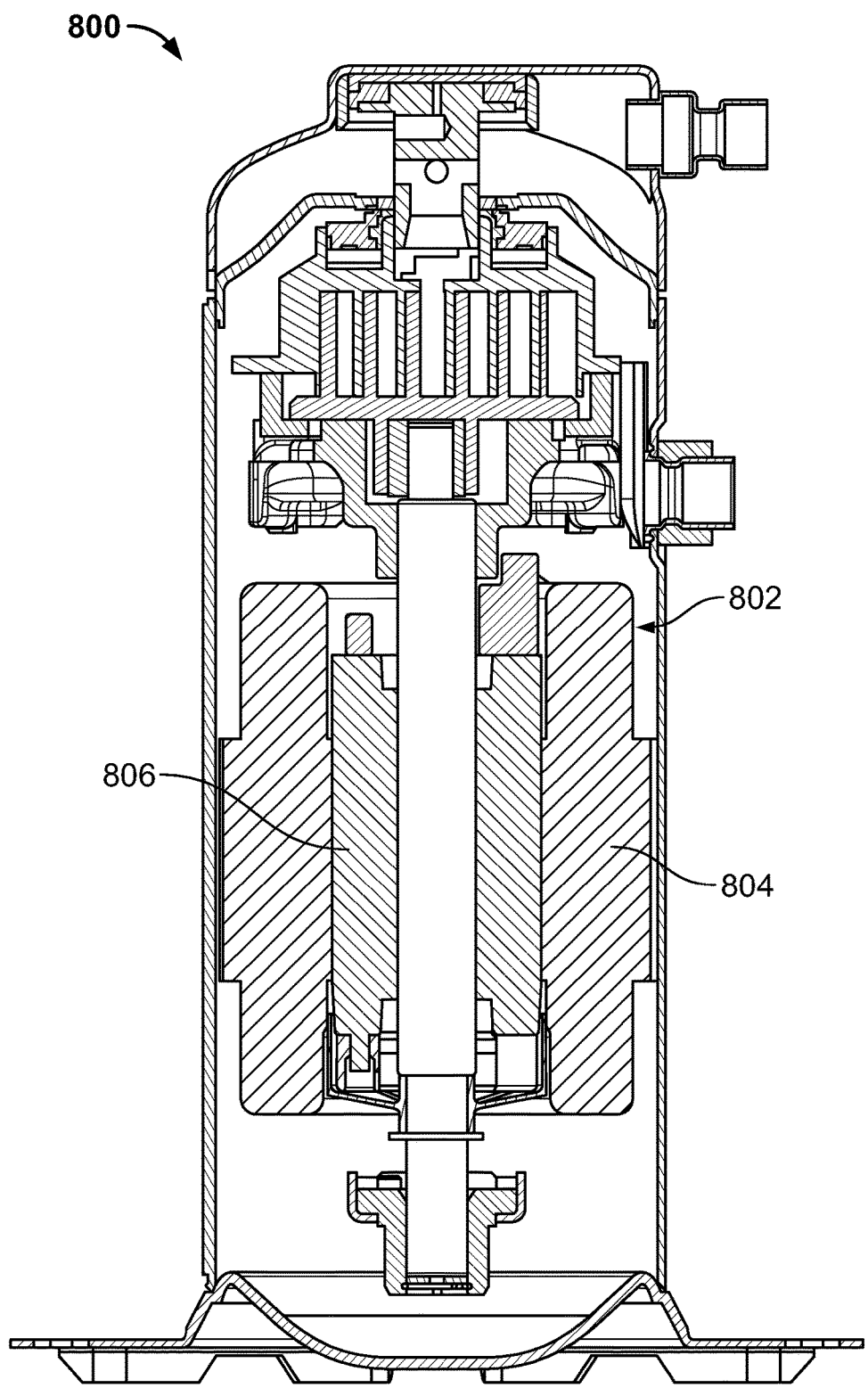
FIG. 8 is a front sectional view of a compressor including an electric motor according to another example embodiment of this disclosure.

The teachings herein may be applied to a wide variety of dynamoelectric machines including brushless permanent magnet (BPM) motors having surface mounted and/or interior permanent magnets, and fixed or variable speed(s). One preferred application is to a hermetic motor. For example, FIG. 8 illustrates a refrigerant compressor 800 having an electric motor 802 including a stator 804 and a rotor 806. Any of the various motors, stators, and rotors described herein may be used as the electric motor 802, stator 804 or rotor 806 in the compressor 800 of FIG. 8.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method of manufacturing electric machines, the method comprising:
   producing a first plurality of stator and rotor laminations using a die press, the first plurality of rotor laminations having a first magnet slot configuration;
   producing a second plurality of stator and rotor laminations using the die press, the second plurality of stator laminations having the same inner diameter and the same outer diameter as the first plurality of stator laminations, the second plurality of rotor laminations having the same inner diameter and the same outer diameter as the first plurality of rotor laminations, the second plurality of rotor laminations having a second magnet slot configuration that is different than the first magnet slot configuration;
   using the first plurality of rotor laminations to form a first rotor, the first magnet slot configuration including a first plurality of magnet slots, the first rotor including a plurality of neodymium permanent magnets in the first plurality of magnet slots; and
   using the second plurality of rotor laminations to form a second rotor, the second magnet slot configuration including a second plurality of magnet slots, and the second rotor including a plurality of ferrite permanent magnets in the second plurality of magnet slots;
   wherein the first rotor and the second rotor are useable with a stator formed with the first plurality of stator laminations or the second plurality of stator laminations.

2. The method of claim 1 wherein the first rotor and the second rotor have different stack heights.

3. The method of claim 1 further comprising changing only magnet slot forming die(s) in the die press between producing the first plurality of stator and rotor laminations and producing the second plurality of stator and rotor laminations.

4. The method of claim 1 wherein the first magnet slot configuration defines the same number of poles and same pole spacing as the second magnet slot configuration, and wherein the first plurality of stator laminations have substantially the same configuration as the second plurality of stator laminations.

5. The method of claim 1 wherein a ratio of the inner diameter of the stator laminations to the outer diameter of the stator laminations is greater than or equal to about sixty percent (60%).

6. The method of claim 5 wherein the ratio of the inner diameter of the stator laminations to the outer diameter of the stator laminations is greater than or equal to about sixty-two percent (62%).

7. The method of claim 6 wherein the ratio of the inner diameter of the stator laminations to the outer diameter of the stator laminations is greater than or equal to about sixty-five percent (65%).

8. The method of claim 1 wherein the first plurality of magnet slots are different than the second plurality of magnet slots.

9. The method of claim 8 wherein the first plurality of magnet slots are trapezoidal-shaped magnet slots and the second plurality of magnet slots are trapezoidal-shaped magnet slots and arc-shaped magnet slots.

\* \* \* \* \*